(12) United States Patent
Jeong et al.

(10) Patent No.: US 8,377,592 B2
(45) Date of Patent: Feb. 19, 2013

(54) NEGATIVE ACTIVE MATERIAL FOR RECHARGEABLE LITHIUM BATTERY, AND METHOD OF PREPARING THE SAME

(75) Inventors: Goo-Jin Jeong, Suwon-si (KR); Sang-Min Lee, Suwon-si (KR); Wan-Uk Choi, Suwon-si (KR); Hun-Joon Sohn, Seoul (KR)

(73) Assignees: Samsung SDI Co., Ltd., Yongin-si (KR); Seoul National University Industry Foundation, Seoul (KR)

( * ) Notice: Subject to any disclaimer, the term of this patent is extended or adjusted under 35 U.S.C. 154(b) by 1145 days.

(21) Appl. No.: 12/212,580

(22) Filed: Sep. 17, 2008

(65) Prior Publication Data

US 2009/0075173 A1    Mar. 19, 2009

(30) Foreign Application Priority Data

Sep. 17, 2007    (KR) .................. 10-2007-0094176

(51) Int. Cl.
*H01M 4/13*    (2010.01)
(52) U.S. Cl. ............... 429/218.1; 429/231.5; 429/231.6; 429/231.95
(58) Field of Classification Search ............ 429/218.1, 429/231.6, 231.5, 231.95
See application file for complete search history.

(56) References Cited

U.S. PATENT DOCUMENTS

| 6,235,427 | B1 | 5/2001 | Idota et al. |
| 7,358,011 | B2 | 4/2008 | Fukuoka et al. |
| 7,776,473 | B2 | 8/2010 | Aramata et al. |
| 2003/0170549 | A1* | 9/2003 | Murai ................... 429/329 |
| 2004/0106040 | A1* | 6/2004 | Fukuoka et al. .......... 429/212 |
| 2007/0224504 | A1* | 9/2007 | Kita et al. ............. 429/231.1 |

FOREIGN PATENT DOCUMENTS

| JP | 2002-216753 | 8/2002 |
| JP | 2004-119176 | 4/2004 |
| JP | 2004-139886 | 5/2004 |
| JP | 2005-149957 A | 6/2005 |
| KR | 10-2004-0047621 | 6/2004 |
| KR | 10-2005-0013841 | 2/2005 |
| KR | 10-2007-0096933 | 10/2007 |
| WO | WO 2005/011030 A1 | 2/2005 |

OTHER PUBLICATIONS

Morita, Tomokazu et al., "Nano Si Cluster-$SiO_x$-C Composite Material as High-Capacity Anode Material for Rechargeable Lithium Batteries", Journal of The Electrochemical Society, 153 (2) A425-A430 (2006).

Miyachi, Mariko et al., "Electrochemical Properties and Chemical Structures of Metal-Doped SiO Anodes for Li-Ion Rechargeable Batteries", Journal of The Electrochemical Society, 154 (4) A376-A380 (2007).

\* cited by examiner

*Primary Examiner* — Lyle Alexander
(74) *Attorney, Agent, or Firm* — Christie, Parker & Hale, LLP

(57) ABSTRACT

An negative active material for a rechargeable lithium battery includes a nano-composite including a Si phase, a $SiO_2$ phase, and a metal oxide phase of formulation $M_yO$, where M is a metal with an oxidation number x, a free energy of oxygen-bond formation ranging from $-900$ kJ/mol to $-2000$ kJ/mol, x, and $x \cdot y = 2$. The negative active material for a rechargeable lithium battery according to the present invention can improve initial capacity, initial efficiency, and cycle-life characteristics by suppressing its initial irreversible reaction.

27 Claims, 5 Drawing Sheets

NEGATIVE ACTIVE MATERIAL FOR RECHARGEABLE LITHIUM BATTERY, AND METHOD OF PREPARING THE SAME

CROSS-REFERENCE TO RELATED APPLICATION

This application claims priority to and the benefit of Korean Patent Application No.10-2007-0094176 filed in the Korean Intellectual Property Office on Sep. 17, 2007, the entire content of which is incorporated herein by reference.

BACKGROUND OF THE INVENTION

1. Field of the Invention

The present invention relates to negative active materials for rechargeable lithium batteries and methods of preparing the same.

2. Description of the Related Art

Lithium rechargeable batteries have recently drawn attention as power sources for small portable electronic devices. These batteries use organic electrolyte solutions and therefore have discharge voltages that are twice as high as conventional battery using alkali aqueous solutions. Accordingly, lithium rechargeable batteries have high energy densities.

Lithium-transition element composite oxides being capable of intercalating lithium such as $LiCoO_2$, $LiMn_2O_4$, $LiNiO_2$, $LiNi_{1-x}Co_xO_2$ (0<x<1), $LiMnO_2$, and so on have been researched for use as positive active materials for lithium rechargeable batteries.

Various carbon-based materials, such as artificial graphite, natural graphite, and hard carbon, all of which can intercalate and deintercalate lithium ions, have been used as negative active materials. The use of graphite tends to increase discharge voltages and energy densities, because it has a low discharge potential of −0.2V, compared to lithium. Batteries using graphite as the negative active material have high average discharge potential of 3.6V and energy densities. Furthermore, graphite is the most commonly used of the aforementioned carbon-based materials because graphite imparts better cycle life due to its outstanding reversibility. However, when used as negative active materials, graphite active materials have low densities and consequently low capacity in terms of energy density per unit volume. Further, there are some dangers such of explosion or combustion when a battery is misused, overcharged, or the like, because graphite is likely to react with the organic electrolyte at high discharge voltages.

To address these problems, research on metal oxide negative active material has recently been performed. For example, amorphous tin oxide has high capacity per weight (800 mAh/g). However, amorphous tin oxide has high initial irreversible capacity up to 50%. Furthermore, tin oxide has a tendency to be reduced to tin metal during the charge or discharge reaction, thereby rendering it disadvantageous for use in batteries.

In another oxide negative electrode, $Li_aMg_bVO_c$ (0.05≦a≦3, 0.12≦b≦2, 2≦2c−a−2b≦5) has been used as a negative active material. However, such an oxide negative electrode does not impart sufficient battery performance and therefore further research into oxide negative materials has been conducted.

SUMMARY OF THE INVENTION

One embodiment of the present invention provides a negative active material for rechargeable lithium batteries that has improved initial capacity, initial efficiency, and cycle-life characteristics by suppressing its initial irreversible reaction.

Another embodiment of the present invention provides a method of preparing the negative active materials.

Another embodiment of the present invention provides a negative electrode and a rechargeable lithium battery that includes the negative active material.

According to one embodiment of the present invention, the negative active material for rechargeable lithium batteries includes a nano-composite having a Si phase, a $SiO_2$ phase, and a metal oxide phase of the formulation $M_yO$, where M is a metal with an oxidation number of x, a free energy of oxygen bond formation ranging from −900 kJ/mol to −2000 kJ/mol, and x·y=2.

According to another embodiment of the present invention, a method of preparing the negative active material for a rechargeable lithium battery includes mechanically alloying a SiO source material and a metal (M) source material (where M has a free energy of oxygen bond formation ranging from −900 kJ/mol to −2000 kJ/mol) to obtain a nano-composite.

According to yet another embodiment of the present invention, there is provided a rechargeable lithium battery with a negative electrode having the negative active material.

The negative active materials for rechargeable lithium batteries according to the present invention can improve initial capacity, initial efficiency, and cycle-life characteristics by suppressing its initial irreversible reaction.

BRIEF DESCRIPTION OF THE DRAWINGS

The above and other features of the present invention will become more apparent by reference to the following detailed description when considered in conjunction with the attached drawings, in which.

DETAILED DESCRIPTION OF THE INVENTION

Figure 1:
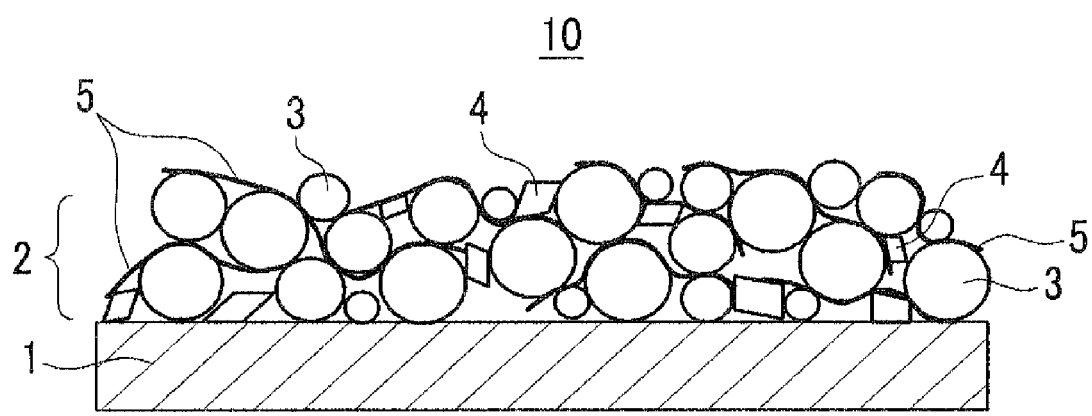
FIG. 1 is a schematic cross-sectional view showing a negative electrode of a lithium rechargeable battery according to one embodiment of the present invention.

A typical rechargeable lithium battery includes a carbon-based material as a negative active material. However, the carbon-based material has limited capacity. Therefore, various alternatives for the carbon-based material have been researched to increase the battery capacity. For example, lithium metal has been suggested as an alternative because of its high energy density. However, lithium metal has safety problems due to growth of dendrites and has a shortened cycle-life as the battery is repeatedly charged and discharged.

Accordingly, metal-based active materials such as Si, Sn, and the like have been suggested as other alternatives. Metal-based active materials have high-capacity and are capable of replacing lithium metal. Among the metal-based active materials, Si has a theoretical maximum capacity of 4000 mAh/g. However, Si can crack easily due to volume changes during discharge and charge cycles. As a result, active material particles can be destroyed, thereby decreasing the battery capacity and cycle-life.

Accordingly, various efforts have been made to prevent decreased cycle-life due to mechanical deterioration. For example, composite active materials, which include a material that reacts with lithium and a material that does not react with lithium have been suggested to address the cycle-life concern.

In one embodiment, the present invention provides a nano-composite as a negative active material that is stable with lithium and has negative Gibbs free energy. The nano-composite is prepared by adding a metal element to silicon oxide such as $SiO_2$ to convert part of the silicon oxide into a metal oxide that is stable for lithium. In this way, the metal oxide can have a negative Gibbs free energy. Accordingly, when the nano-composite is used as a negative active material in a rechargeable lithium battery, the initial irreversible reaction can be suppressed; thereby improving the initial capacity, initial efficiency, and cycle-life characteristics According to one embodiment of the present invention, the negative active material for a rechargeable lithium battery includes a nano-composite having a Si phase, a $SiO_2$ phase, and metal phase of the formulation $M_yO$, where M is a metal with an oxidation number of x, a free energy of oxygen bond formation ranging from $-900$ kJ/mol to $-2000$ kJ/mol, and $x \cdot y = 2$.

The nano-composite can be obtained by mechanically alloying a solid-phase mixture of a SiO source material and a metal (M) source material. Nonlimiting examples of suitable SiO source materials include, Si, and Si-containing oxides, According to one embodiment, when a SiO source material is reacted with a metal (M) source material, M partly reacts with O in SiO to form a metal oxide that is stable for lithium.

Reaction Scheme 1

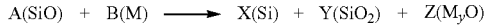
A(SiO) + B(M) → X(Si) + Y(SiO₂) + Z(M_yO)

In the above reaction scheme, M is a metal element that irreversibly converts silicon oxide to an oxide with a negative change in Gibbs free energy; A and B are the moles of the SiO source material and the metal (M) source material, respectively; X, Y, and Z indicate moles of the Si phase, $SiO_2$ phase, and the metal oxide phase included in the nano-composite, respectively.

In one embodiment, not all available SiO participate in the above reaction. Only some is reduced to a Si phase and the rest remains as silicon oxide (e.g., $SiO_2$.)

In one embodiment, the Si phase in the nano-composite comprises nano-grains Si and is capable of doping and de-doping lithium ions.

In one embodiment, the Si phase in a nano-composite is present at an amount ranging from 40 to 80 mol %. In another embodiment, the Si phase in a nano-composite is present at an amount ranging from 50 to 70 mol %. When an amount of Si phase is less than 40 mol %, the battery capacity may deteriorate. When the amount of Si phase is more than 80 mol %, it may cause volume expansion and decreased cycle-life characteristics.

The $SiO_2$ phase is amorphous and irreversibly reacts with lithium ions during the discharge cycle, thereby forming Li—Si—O or $Si+Li_2O$. As the amount of $SiO_2$ increases, the initial irreversible reaction may also increase thereby deteriorating the initial efficiency. Accordingly, in one embodiment, the amount of $SiO_2$ in a nano-composite ranges from 5 to 45 mol %. In another embodiment, the amount of $SiO_2$ ranges from 15 to 30 mol %. When the amount of $SiO_2$ is less than 5 mol %, volume expansion may incur thereby deteriorating the cycle-life characteristics. When the amount of $SiO_2$ is more than 45 mol %, the initial irreversible reactions may increase.

The metal oxide thermodynamically has a higher negative change in Gibbs free energy than silicon oxide. Further, the metal oxide is amorphous, stable for lithium and accordingly can suppress the initial irreversible reaction.

The metal oxide is formed through an irreversible reaction of a metal with a part of silicon oxide such as $SiO_2$. The metal has a free energy of oxygen bond formation ranging from $-900$ kJ/mol to $-2000$ kJ/mol, and may be selected from the group consisting of Al, Ca, Mg, Ti, Li, and combinations thereof.

The metal oxide is stable for lithium and can suppress the initial irreversible reaction. However, it can deteriorate the battery capacity when used excessively. Accordingly, in one embodiment, the nano-composite has a metal oxide concentration ranging from 3 to 50 mol %. In another embodiment, the nano-composite has a metal oxide concentration ranging from 10 to 20 mol %. When the concentration of metal oxide is less than 3 mol %, the initial efficiency may deteriorate. When the concentration of metal oxide is more than 50 mol %, the reversible capacity may decrease.

The above nano-composite has a $SiO_2$ absorption spectrum ranging from 970 $cm^{-1}$ to 1150 $cm^{-1}$ according to infrared spectrometry. In one embodiment, the nano-composite has a $SiO_2$ absorption spectrum ranging from 970 $cm^{-1}$ to 1040 $cm^{-1}$. So long as the silicon oxide in the nano-composite has an absorption spectrum that is within any of the above the ranges, it can properly maintain the cycle-life and rate capability.

In one embodiment, the nano-composite has a Si 2 p peak ranging from 99 eV to 106 eV according to X-ray spectroscopic analysis. In another embodiment, the nano-composite has a Si 2 p peak ranging from 101 eV to 104 eV according to X-ray spectroscopic analysis. So long as the silicon oxide in the nano-composite has an absorption spectrum that is within any of the above ranges, it can properly maintain the cycle-life and rate capability.

When the nano-composite includes a metal oxide, the X-ray spectroscopic analysis results vary in accordance with the metal (M) used. For example, the nano-composite has an Al 2 p peak ranging from 74 to 77 eV when M is Al; a Ca 2 p peak ranging from 345 to 349 eV when M is Ca; and a Ti 2 p peak ranging from 457 to 461 eV when M is Ti.

In various embodiments, the nano-composite may be surface-treated with a conductive material in order to have improved electrical conductivity, as well as improved initial efficiency and cycle-life characteristics of the active material.

The conductive material should not react with lithium, should be light, and should have a high electrical conductivity. In one embodiment, the conductive material has an electrical conductivity higher than $1 \times 10^6$ S/m. In another embodiment, the conductive material has an electrical conductivity ranging from $1 \times 10^7$ to $1 \times 10^9$ S/m. The conductive material may be selected from the group consisting of a carbon-based material such as crystalline carbon, amorphous carbon, or the like; and an element selected from the group consisting of group 9, group 10, and group 11 elements in the IUPAC periodic table, and mixtures thereof. In one embodiment, the conductive material is selected from the group consisting of crystalline carbon, amorphous carbon, Cu, Ni, Ag, Fe, and mixtures thereof. Nonlimiting examples of suitable crystalline carbon include amorphous, plate-shape, flake, sphericalshape carbons, fiber-shape natural graphite, and artificial graphite. Nonlimiting examples of suitable amorphous carbon include soft carbon (low temperature fired carbon), hard carbon, mesophase pitch carbide, fired coke, and so on.

In one embodiment, the conductive material may be present in an amount less than 50 wt % based on the entire weight of an active material. In another embodiment, the conductive material may be present in an amount ranging from 2 to 20 wt % based on the entire weight of an active material. When the amount of the conductive material exceeds 50 wt %, the capacity per unit weight may decrease.

In one embodiment, the nano-composite has an average particle size ranging from 0.1 μm to 100 μm. In another embodiment, the nano-composite has an average particle size ranging from 1 μm to 20 μm. When the negative active material has an average particle size less than 0.1 μm, the substrate density may decrease. When negative active material has an average particle size greater than 100 μm, the rate of charge-discharge reaction may deteriorate.

In one embodiment, the negative active material has a specific surface area ranging from 1 $m^2/g$ to 100 $m^2/g$. In another embodiment, the negative active material has a specific surface area ranging from 1 $m^2/g$ to 50 $m^2/g$. When the negative active material has a specific surface area less than 1 $m^2/g$, the rate of charge-discharge reaction may decrease. When the negative active material has a specific surface area exceeds 100 $m^2/g$, unwanted side reactions may occur.

According to one embodiment of the present invention, the negative active material including a nano-composite can be obtained by mechanically alloying a SiO source material and a metal source material.

In one embodiment, mechanical alloying is done by ball milling two or more reactants, such as solid-phase SiO material with a metal (M) source material. During the mechanical alloying process, the materials are trapped between the colliding balls, which cause fracturing and cold welding of the materials. In one embodiment, the mechanical alloying process generates heat, which promotes subsequent reactions. The product produced from the mechanical alloying process is amorphous or nano-grain.

The SiO source material may include a mixture of Si metal powder and a Si-containing oxide such as $SiO_2$, or the like. In one embodiment, the SiO source material has a Si metal powder:Si-containing oxide mole ratio ranging from 40:60 to 60:40. In another embodiment, the SiO source material has a Si metal powder:Si-containing oxide mole ratio of 50:50. When the SiO source material has a Si metal powder:Si-containing oxide mole ratio outside of the above range, the resulting SiO may not be amorphous.

The metal (M) source material may be selected from the group consisting of a metal with a free energy of oxygen-bond formation ranging from −900 kJ/mol to −2000 kJ/mol, an oxide or hydroxide of the metal, and mixtures thereof. In one embodiment, the metal source may be selected from the group consisting of Al, Ca, Mg, Ti, Li, and their respective oxide or hydroxides, and mixtures thereof.

In one embodiment, the mole ratio of a SiO source material:metal source material ranges from 0.55:1 to 20:1 (SiO: M). When an amount of M is less than the above specified mole ratio range, there is little effect on suppressing the irreversible reaction. When an amount of M exceeds the specified mole ratio range, the capacity and rate of charge-discharge reaction may deteriorate. In on embodiment, the mole ratio of SiO and the metal source material can be determined based on the oxidation number of the metal. When the metal has an oxidation number of 1, the mole ratio of a SiO-source material:metal source material ranges from 0.55:1 to 10:1. In another embodiment, the mole ratio of a SiO-source material:metal source material ranges from 1:1 to 5:1. When the mole ratio the SiO and metal source materials is outside of the above specified range, non-active oxides can be overproduced, thereby deteriorating the capacity.

In one embodiment, when the metal has an oxidation number of 2, the mole ratio of a SiO-source material:metal source material ranges from 1.05:1 to 10:1. In another embodiment, the mole ratio of a SiO-source material:metal source material ranges from 1.5:1 to 5:1. When the mole ratio is out of the range, non-active oxide may be overproduced, thereby deteriorating the capacity.

In one embodiment, when the metal has an oxidation number of 3, the mole ratio of a SiO-source material:metal source material ranges from 1.505:1 to 10:1. In another embodiment, the mole ratio of a SiO-source material:metal source material ranges from 2.5:1 to 7:1. When the mole ratio of the SiO and metal source materials is out of the above specified range, non-active oxides may be produced, thereby deteriorating the capacity.

In one embodiment, when the metal has an oxidation number of 4, the mole ratio of a SiO-source material:metal source material ranges from 2.05:1 to 20:1. In another embodiment, the mole ratio OF a SiO-source material:metal source material ranges from 3:1 to 10:1. When the mole ratio of the SiO and metal source materials is outside of the above specified range, non-active oxides may be produced, thereby deteriorating the capacity.

In one embodiment, when the metal (M) has an oxidation number of 5, the mole ratio of a SiO-source material:metal (M) source material ranges from 2.55:1 to 20:1. In another embodiment, the mole ratio of a SiO-source material:metal (M) source material ranges from 1:5 to 10:1. When the mole ratio is outside of the above specified range, non-active oxide may be produced, thereby deteriorating the capacity.

The balls used in the ball milling process can be made from zirconium, stainless steel, tool steel, or mixtures thereof.

In one embodiment, the balls can be added at 10 to 30 times the entire weight of a solid-phase mixture of SiO and metal source materials. In another embodiment, the balls can be added at 15 to 20 times the entire weight of a solid-phase mixture of SiO and metal source materials. When the balls are added at less than 10 times the entire weight of a solid-phase mixture of SiO and metal source materials, a reaction may not occur. However, when they are added more than 30 times the entire weight of a solid-phase mixture of SiO and metal source materials, it may cause process inefficiency.

In one embodiment, the solid-phase mixing is performed at a speed ranging from 200 to 1000 rpm. In another embodiment, the solid-phase mixing is performed at a speed ranging from 500 to 800 rpm. In yet another embodiment, the solid-phase mixing is performed at a speed ranging from 600 to 700 rpm. When the mixing speed is slower than 200 rpm, a reaction may not occur. When it is faster than 1000 rpm, it may cause process inefficiency.

The solid-phase mixture of SiO and metal (M) source materials may include a reaction controlling agent selected from the group consisting of hexane, carbon-based materials, and alcohols, to promote a reaction.

After mechanical alloying, the negative active material may optionally be subjected to heat treatment.

In one embodiment, the heat treatment is performed under an inert atmosphere. Nonlimiting examples of gases for the inert atmosphere include, nitrogen, argon, helium, and combinations thereof.

In one embodiment, the heat treatment is performed at a temperature ranging from 500 to 1100° C. In one embodiment, the heat treatment is performed at a temperature ranging from 600 to 900° C. When the heat treatment is performed at a temperature of lower than 500° C., a reaction may not occur. When the heat treatment is performed at a temperature higher than 1100° C., silicon and oxides may excessively form, thereby deteriorating the battery characteristics.

According to an embodiment of the present invention, the nano-composite prepared in the aforementioned method can be surface-treated with a conductive material.

In other words, after the mechanical alloying process, the nano-composite can be optionally surface-treated with a conductive material.

The conductive material may be the same as described previously, and any conventional technique can be used for the surface treatment. Nonlimiting examples of suitable technique include, magnetron sputtering, electron beam deposition, IBID (ion beam assisted deposition), CVD (chemical vapor deposition), sol-gel methods, and methods of forming membranes by ionizing evaporated particles.

The amount of conductive material surface-treated on a nano-composite will be described further below.

Since the negative active material for a rechargeable lithium battery can suppress the initial irreversible reaction, the initial capacity, efficiency, and cycle-life characteristics of the rechargeable lithium battery can be improved. In one embodiment, the use of the conductive material further improves the initial efficiency and cycle-life characteristics.

According to another embodiment of the present invention, there is provided a negative electrode including the negative active material.

Referring to FIG. 1, the negative electrode 112 includes a current collector 1 and an active material layer 2 disposed on the current collector 1.

The current collector 1 may be selected from the group consisting of copper foil, nickel foil, stainless steel foil, titanium foil, nickel foam, copper foam, and polymer materials coated with a conductive metal.

The active material layer 2 includes a negative active material 3, a binder 5, and a conductive material 4.

The negative active material 3 is the same as above-described, and may be included in an amount ranging from 1 to 99 wt % based on the total weight of the negative active material layer 2. In one embodiment, the negative active material is included in an amount ranging from 10 to 98 wt % based on the total weight of the negative active material layer 2. When the negative active material is outside of this range, capacity may deteriorate, or the relative amount of binder maybe reduced, and thereby deteriorating the adherence between the negative active material layer and the current collector.

The binder 5 improves binding properties of the particle-type negative active material 3 to itself and to a current collector. Examples suitable binders include, but are not limited to, polyvinylalcohol, carboxylmethyl cellulose, hydroxypropylene cellulose, diacetylene cellulose, polyvinylchloride, carboxylated polyvinylchloride, polyvinyldifluoride, an ethylene oxide-containing polymer, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, and nylon.

The binder may be included in an amount ranging from 1 to 20 wt % based on the total weight of the negative active material layer 2. In one embodiment, the binder may be included in an amount ranging from 2 to 10 wt % based on the total weight of the negative active material layer 2. When the amount of the binder is less than 1 wt %, sufficient adherence may not be obtained. When the amount of the binder it is more than 20 wt %, the capacity may deteriorate.

The negative active material layer may further include a conductive material 4 to improve electrical conductivity of a negative electrode.

Any electrically conductive material 4 can be used so long as it does not cause a chemical change. Nonlimiting examples of suitable conductive materials include, natural graphite, artificial graphite, carbon black, acetylene black, ketjen black, polyphenylene derivatives, carbon fibers, metal powders or metal fibers including copper, nickel, aluminum, silver, and so on. Among the suitable conductive materials, natural graphites or artificial graphites have good conductivity, and therefore can maintain a conductive network during electrode expansion.

The conductive material may be provided in any one or more or various shapes such as particles, flakes, and fibers, but the shape is not limited thereto.

The conductive material 4 may be included in an amount of 50 wt % or less based on the total weight of the negative active material layer 2. In one embodiment, the conductive material 4 may be included in an amount ranging from 1 to 20 wt % based on the total weight of the negative active material layer 2. When the amount of the conductive material is more than 50 wt %, the electrode energy density may deteriorate.

The above-mentioned negative electrode 112 is provided by mixing a negative active material 3, optionally with a conductive material 4, and a binder 5 in a solvent to obtain a composition for a negative active material layer, and coating the composition on a current collector. Methods of manufacturing electrodes are well known in this art, so a detailed description thereof is omitted. The solvent may include N-methylpyrrolidone, but it is not limited thereto.

The negative electrode having the above structure can be applied to a rechargeable lithium battery.

The rechargeable lithium battery includes a negative electrode, a positive electrode including a positive active material that is capable of intercalating and deintercalating lithium ions, and an electrolyte, which includes a non-aqueous organic solvent and a lithium salt.

Rechargeable lithium batteries can be classified as lithium ion batteries, lithium ion polymer batteries, and lithium polymer batteries based on the presence of a separator and the types of electrolyte used in the battery. Rechargeable lithium batteries may have a variety of shapes and sizes, which include cylindrical, prismatic, or coin-type shapes. They can also be thin-film type batteries or bulk-type batteries. Structures and fabricating methods for lithium ion batteries pertaining to the present invention are well known in the art.

Figure 2:
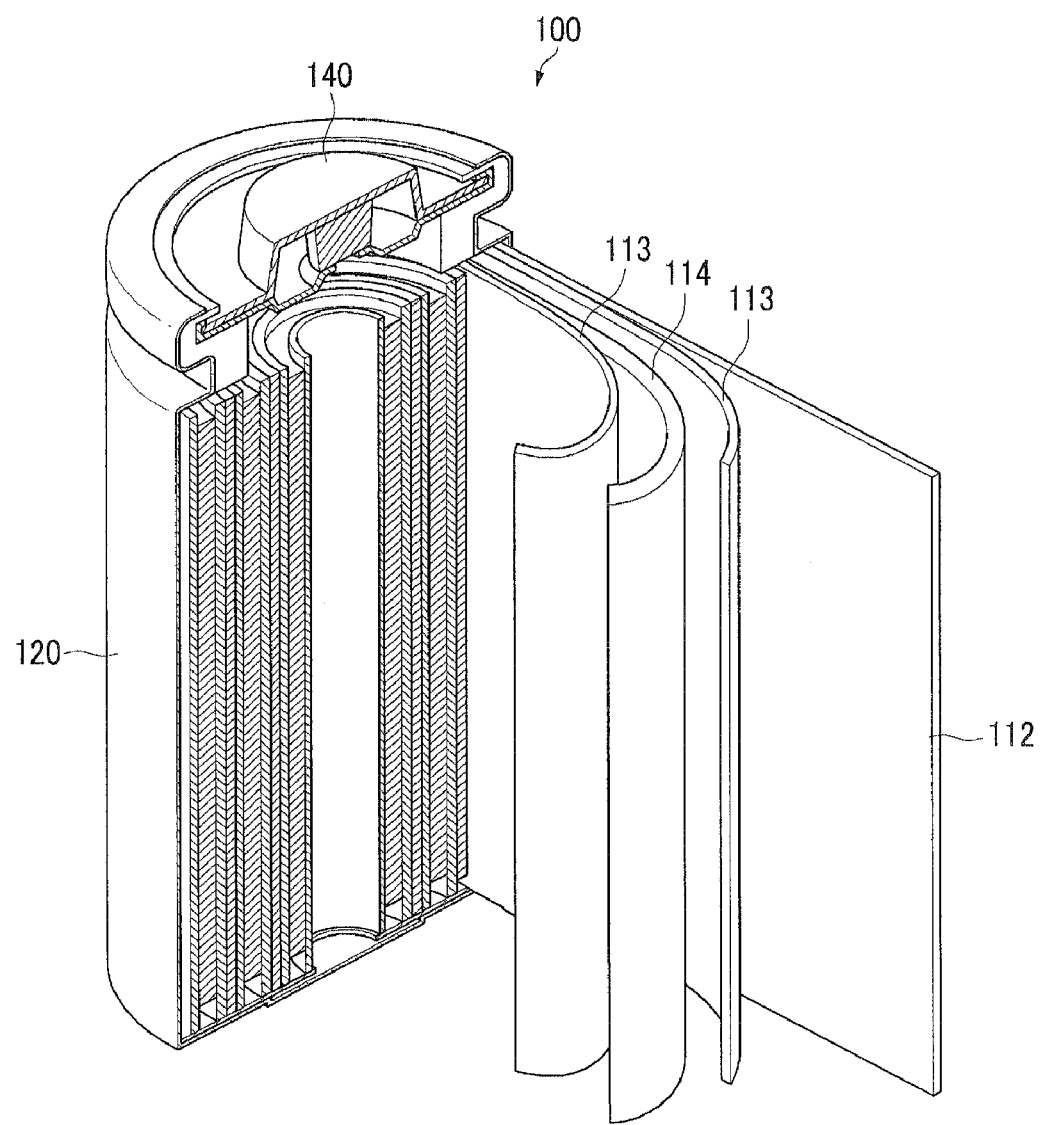
FIG. 2 is a cross-sectional perspective view of a rechargeable lithium battery according to one embodiment of the present invention.

FIG. 2 shows a structure of a rechargeable lithium battery 100 according to one embodiment of the present invention. The rechargeable lithium battery 100 includes a negative electrode 112, a positive electrode 114, a separator 113 interposed between the negative electrode 112 and the positive electrode 114, an electrolyte impregnating the separator 113, a battery case 120, and a sealing member 140 sealing the battery case 120.

The negative electrode 112 is the same as previously described above.

The positive electrode 114 includes a current collector, and a positive active material layer disposed on the current collector.

The positive active material layer may include a positive active material, for example, a lithiated intercalation compound that is capable of reversibly intercalating and deintercalating lithium ions. Nonlimiting examples of suitable lithiated intercalation compounds include compounds of the following Chemical Formulas 1 to 24.

$$Li_aA_{1-b}B_bD_2 \quad \text{Chemical Formula 1}$$

where, $0.95 \leq a \leq 1.1$ and $0 \leq b \leq 0.5$.

$$Li_aE_{1-b}B_bO_{2-c}L_c \quad \text{Chemical Formula 2}$$

where, $0.95 \leq a \leq 1.1$, $0 \leq b \leq 0.5$, and $0 \leq c \leq 0.05$.

$$LiE_{2-b}B_bO_{4-c}L_c \quad \text{Chemical Formula 3}$$

where, $0 \leq b \leq 0.5$ and $0 \leq c \leq 0.05$.

$$Li_aN_{1-b-c}Co_bB_cD_\alpha \quad \text{Chemical Formula 4}$$

where, $0.95 \leq a \leq 1.1$, $0 \leq b \leq 0.5$, $0 \leq c \leq 0.05$, and $0 < \alpha < 2$.

$$Li_aN_{1-b-c}Co_bB_cO_{2-\alpha}L_2 \quad \text{Chemical Formula 5}$$

where, $0.95 \leq a \leq 1.1$, $0 \leq b \leq 0.5$, $0 \leq c < 0.05$, and $0 < \alpha < 2$.

$$Li_aN_{1-b-c}Co_bB_cO_{2-\alpha}L_2 \quad \text{Chemical Formula 6}$$

where, $0.95 \leq a \leq 1.1$, $0 \leq b \leq 0.5$, $0 \leq c < 0.05$, and $0 < \alpha < 2$.

$$Li_aN_{1-b-c}Mn_bB_cD_\alpha \quad \text{Chemical Formula 7}$$

where, $0.95 \leq a \leq 1.1$, $0 \leq b \leq 0.5$, $0 \leq c \leq 0.05$, and $0 < \alpha \leq 2$.

$$Li_aN_{1-b-c}Mn_bB_cO_{2-\alpha}L_\alpha \quad \text{Chemical Formula 8}$$

where, $0.95 \leq a \leq 1.1$, $0 \leq b < 0.5$, $0 \leq c \leq 0.05$, and $0 < \alpha < 2$.

$$Li_aN_{1-b-c}Mn_bB_cO_{2-\alpha}L_2 \quad \text{Chemical Formula 9}$$

where, $0.95 \leq a \leq 1.1$, $0 \leq b \leq 0.5$, $0 \leq c \leq 0.05$, and $0 < \alpha < 2$.

$$Li_aNi_bE_cG_dO_2 \quad \text{Chemical Formula 10}$$

where, $0.90 \leq a \leq 1.1$, $0 \leq b \leq 0.9$, $0 \leq c \leq 0.9$, and $0.001 \leq d \leq 0.1$.

$$Li_aNi_bCo_cMn_dGeO_2 \quad \text{Chemical Formula 11}$$

where, $0.90 \leq a \leq 1.1$, $0 \leq b \leq 0.9$, $0 \leq c \leq 0.5$, $0 \leq d \leq 0.5$, and $0.001 \leq e \leq 0.1$.

$$Li_aNiG_bO_2 \quad \text{Chemical Formula 12}$$

where, $0.90 \leq a \leq 1.1$ and $0.001 \leq b \leq 0.1$.

$$Li_aCoG_bO_2 \quad \text{Chemical Formula 13}$$

where, $0.90 \leq a \leq 1.1$ and $0.001 \leq b \leq 0.1$.

$$Li_aMnG_bO_2 \quad \text{Chemical Formula 14}$$

where, $0.90 \leq a \leq 1.1$ and $0.001 \leq b \leq 0.1$.

$$Li_aMn_2G_bO_4 \quad \text{Chemical Formula 15}$$

where, $0.90 \leq a \leq 1.1$ and $0.001 \leq b \leq 0.1$.

$$QO_2 \quad \text{Chemical Formula 16}$$

$$QS_2 \quad \text{Chemical Formula 17}$$

$$LiQS_2 \quad \text{Chemical Formula 18}$$

$$V_2O_5 \quad \text{Chemical Formula 19}$$

$$LiV_2O_5 \quad \text{Chemical Formula 20}$$

$$LiIO_2 \quad \text{Chemical Formula 21}$$

$$LiNiVO_4 \quad \text{Chemical Formula 22}$$

$$Li_{(3-f)}J_2(PO_4)_3 \quad \text{Chemical Formula 23}$$

where, $0 \leq f \leq 3$ $$Li_{(3-f)}Fe_2(PO_4)_3 \quad \text{Chemical Formula 24}$$

where, $0 \leq f \leq 2$

In Chemical Formulas 1 to 24 above, A is selected from the group consisting of Ni, Co, and Mn; B is selected from the group consisting of Al, Ni, Co, Mn, Cr, Fe, Mg, Sr, V, and rare earth elements; D is selected from the group consisting of O, F, S, and P; E is selected from the group consisting of Co, and Mn; L is selected from the group consisting of F, S, and P; G is selected from the group consisting of Al, Cr, Mn, Fe, Mg, Sr, V, and lanthanide elements such as La, Ce; Q is selected from the group consisting of Ti, Mo, and Mn; I is selected from the group consisting of Cr, V, Fe, Sc, and; and J is selected from the group consisting of V, Cr, Mn, Co, Ni, and Cu.

In one embodiment, the positive active material may include inorganic sulfur ($S_8$, elemental sulfur) and/or a sulfur-based compound. The sulfur-based compound may include $Li_2S_n$ ($n \geq 1$), $Li_2S_n$ ($n \geq 1$) dissolved in a catholyte, an organic sulfur compound, a carbon-sulfur polymer (($C_2S_f$)n: f=2.5 to 50, $n \geq 2$), or the like.

In one embodiment, the positive active material includes a coating layer. In another embodiment, the positive active material is a compound of the active materials coated with a coating layer. The coating layer may include one coating compound selected from the group consisting of oxides and hydroxides of a coating element, oxyhydroxide, oxycarbonate, and hydroxycarbonate of the coating element. The compound for the coating layer may either be amorphous or crystalline. Examples of suitable coating elements include, but are not limited to, Mg, Al, Co, K, Na, Ca, Si, Ti, V, Sn, Ge, Ga, B, As, Zr, and combinations thereof. The coating process may be any conventional process so long as it does not cause any side effects to the properties of the positive active material (e.g., spray coating, immersing). Such processes are well known to persons having ordinary skills in the art, so a detailed description is not provided.

In one embodiment, the positive active material layer further includes a binder and a conductive material.

The binder improves adhesion between the positive active material particles and adhesion between the positive active material particles to a current collector. Nonlimiting examples of suitable binders include polyvinylalcohol, carboxylmethyl cellulose, hydroxypropyl cellulose, diacetyl cellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, and nylon.

The conductive material improves electrical conductivity of the positive electrode. Any electrically conductive material can be used as a conductive agent so long as it does not cause a chemical change. Nonlimiting examples of suitable conductive materials include natural graphite, artificial graphite, carbon black, acetylene black, ketjen black, polyphenylene derivatives, carbon fibers, metal powders, or metal fibers including copper, nickel, aluminum, silver, and so on.

One nonlimiting example of a suitable current collector is Al.

The positive electrode may be fabricated by mixing a positive active material, a binder, and a conductive agent to form a positive active material composition, which is then coated on a current collector such as aluminum.

In one embodiment, the electrolyte includes a lithium salt dissolved in a non-aqueous organic solvent.

The lithium salt supplies lithium ions in the battery. It helps facilitating the basic operation of a rechargeable lithium battery and improves lithium ion transport between positive and negative electrodes.

Nonlimiting examples of suitable lithium salts include $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_2$, $LiAlCl_4$, $LiN(C_pF_{2p+1}SO_2)(C_qF_{2q+1}SO_2)$ (where p and q are natural numbers), LiCl, LiI, lithium bisoxalate borate, and combinations thereof.

The lithium salt may be used at a concentration ranging from 0.1 to 2.0 M. According to one embodiment, the lithium salt may be used at a concentration ranging from 0.7 to 1.6 M. When the lithium salt concentration is less than 0.1 M, electrolyte performance may deteriorate due to low electrolyte conductivity. When the lithium salt concentration is more than 2.0 M, the lithium ion mobility may be reduced due to an increase in electrolyte viscosity.

The non-aqueous organic solvent acts as a medium for transmitting ions taking part in the electrochemical reaction of the battery. Nonlimiting examples of suitable non-aqueous organic solvents include carbonate-based, ester-based, ether-based, ketone-based, alcohol-based, and aprotic solvents. Nonlimiting examples of suitable carbonate-based solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Nonlimiting examples of suitable ester-based solvents include n-methyl acetate, n-ethyl acetate, n-propyl acetate, dimethylacetate, methylpropionate, ethylpropionate, γ-butyrolactone, decanolide, valerolactone, mevalonolactone, and caprolactone. Nonlimiting examples of suitable ether-based solvents include dibutyl ether, tetraglyme, diglyme, dimethoxyethane, 2-methyltetrahydrofuran, and tetrahydrofuran. Nonlimiting examples of suitable ketone-based solvents include cyclohexanone. Nonlimiting examples of suitable alcohol-based solvents include ethyl alcohol, and isopropyl alcohol. Nonlimiting examples of suitable aprotic solvents include nitrites such as X—CN (where X is a C2 to C20 linear, branched, or cyclic hydrocarbon, a double bond, an aromatic ring, or an ether bond), amides (such as dimethylformamide), and dioxolanes (such as 1,3-dioxolane, sulfolanes).

The non-aqueous organic solvent may be a single solvent or a mixture of solvents. When the organic solvent is used in a mixture, the mixture ratio can be controlled according to the desired battery performance.

The carbonate-based solvents may include a mixture of a cyclic carbonate and a linear carbonate. The cyclic carbonate and chain carbonate can be mixed together in a volume ratio ranging from 1:1 to 1:9. When such a mixture is used as an electrolyte, electrolyte performance may be enhanced.

In one embodiment, the electrolyte may further include a mixture of carbonate-based solvents and aromatic hydrocarbon-based solvents. The carbonate-based solvents and the aromatic hydrocarbon-based solvents are preferably mixed together in a volume ratio ranging from 1:1 to 30:1.

The aromatic hydrocarbon-based organic solvent may be represented by Formula 25:

Chemical Formula 25

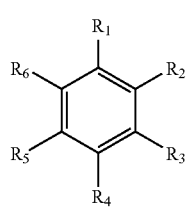

In Formula 25, each of the $R_1$ to $R_6$ groups is independently selected from the group consisting of hydrogen, halogens, C1 to C10 alkyls, and C1 to C10 haloalkyls.

Nonlimiting examples of suitable aromatic hydrocarbon-based organic solvents include, but are not limited to, benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, and xylene.

The non-aqueous electrolyte may further include vinylene carbonate or an ethylene carbonate-based compound of the Formula 26:

Chemical Formula 26

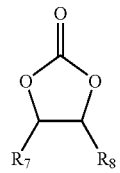

In Formula 26, each of the $R_7$ and $R_8$ groups is independently selected from the group consisting of hydrogen, halogens, cyano (CN), nitro ($NO_2$), and C1 to C5 fluoroalkyls. In one embodiment, both $R_7$ and $R_8$ cannot simultaneously be hydrogen.

Nonlimiting examples of suitable ethylene carbonate-based compounds include difluoroethylene carbonate, chloroethylene carbonate, dichloroethylene carbonate, bromoethylene carbonate, dibromoethylene carbonate, nitroethylene carbonate, cyanoethylene carbonate, and fluoroethylene carbonate. The amount of each of the additives for improving the cycle-life may be adjusted within an appropriate range.

The rechargeable lithium battery may further include a separator between a negative electrode 112 and a positive electrode 114, as needed. The separator 113 separates the negative electrode 112 and the positive electrode 114, and provides a path for transporting lithium ions. Nonlimiting examples of suitable separator 113 materials include polyethylene, polypropylene, polyvinylidene fluoride, and multi-layers thereof. Nonlimiting examples of suitable multilayer separators 113 include polyethylene/polypropylene double-layered separators, polyethylene/polypropylene/polyethylene triple-layered separators, and polypropylene/polyethylene/polypropylene triple-layered separators.

The following examples illustrate certain aspects of the present invention. These examples, however, are presented for illustrative purpose only and are not to be interpreted as limiting the scope of the invention.

EXAMPLE 1

SiO with a $Si:SiO_2$ mole ratio of 1:1 was mixed with Al (with a formation free energy value of −1582 kJ/mol) at a SiO:Al mole ratio of 3:1. The mixture was put in a stainless steel vial containing steel balls at 20 times the weight of the mixture, and a small amount of n-hexane as a reaction controlling agent. The mixture was milled at 500 to 700 rpm for 100 hours to form a mechanical alloy powder. The acquired powder was heat-treated under a nitrogen atmosphere at 900° C. for about 6 hours, to form a negative active material. The resulting negative material has a nano-composite having a $Si:SiO_2:Al_2O_3$ mole ratio of $3/2:1/2:1/3$.

80 wt % of the resulting negative active material, 10 wt % of Super-P, and 10 wt % of a polytetrafluoroethylene binder were mixed in N-methylpyrrolidone as a solvent, to produce a negative active material slurry. The negative active material slurry was coated on a copper-foil current collector to produce a negative electrode.

EXAMPLE 2

SiO with a $Si:SiO_2$ mole ratio of 1:1 was mixed with Al (with a formation free energy value of −1582 kJ/mol) at a mole ratio of 3:1. The mixture was put in a stainless steel vial containing steel balls at 20 times the weight of the mixture and a small amount of n-hexane as a reaction controlling agent. The mixture was milled at about 500 to 700 rpm for 100 hours to form a mechanical alloy, and subsequently a negative active material. The resulting negative material has a $Si:SiO_2:Al_2O_3$ mole ratio of $3/2:1/2:1/3$.

80 wt % of the resulting negative active material, 10 wt % of Super-P, and 10 wt % of a polytetrafluoroethylene binder were mixed in N-methylpyrrolidone as a solvent, to provide a negative active material slurry. The negative active material slurry was coated on a copper-foil current collector to provide a negative electrode.

EXAMPLE 3

SiO with a $Si:SiO_2$ mole ratio of 1:1 was mixed with Ca (with a formation free energy value of −1480 kJ/mol) at a mole ratio of 3:1. The mixture was put in a stainless steel vial containing steel balls at 20 times the weight of the mixture and a small amount of n-hexane as a reaction controlling agent. The mixture was milled at about 500 to 700 rpm for 50 hours to form a mechanical alloy powder. The acquired powder was heat-treated for a reaction under an argon atmosphere at 900° C. for about 6 hours, to provide a negative active material. The resulting negative material has a composite with a $Si:SiO_2:CaO$ mole ratio of $3/2:1/2:1/3$.

80 wt % of the resulting negative active material, 10 wt % of Super-P, and 10 wt % of a polytetrafluoroethylene binder were mixed in N-methylpyrrolidone as a solvent, to provide a negative active material slurry. The negative active material slurry was coated on a copper-foil current collector to provide a negative electrode.

EXAMPLE 4

SiO with a $Si:SiO_2$ mole ratio of 1:1 was mixed with Ti (with a formation free energy value of −820 kJ/mol) in a mole ratio of 4:1. The mixture was put in a tool steel vial containing steel balls at 20 times the weight of the mixture and a small amount of n-hexane as a reaction controlling agent. The mixture was milled at 500 to 700 rpm for 100 hours to form a mechanical alloy powder. The acquired powder was heat-treated under an argon atmosphere at 900° C. for about 6 hours, to provide a negative active material. The resulting negative material has a $Si:SiO_2:Al_2O_3$ mole ratio of 3:1:1.

80 wt % of the resulting negative active material, 10 wt % of Super-P, and 10 wt % of a polytetrafluoroethylene binder were mixed in N-methylpyrrolidone as a solvent to provide a negative active material slurry. The negative active material slurry was coated on a copper-foil current collector to provide a negative electrode.

EXAMPLE 5

SiO with a $Si:SiO_2$ mole ratio of 1:1 was mixed with Ti (with a formation free energy value of −820 kJ/mol) at a mole ratio of 4:1. The mixture was put in a tool steel vial containing steel balls at 20 times the weight of the mixture and a small amount of n-hexane as a reaction controlling agent to form a mechanical alloy by milling at about 500 to 700 rpm for 100 hours. The resulting process produced a negative active material. The resulting negative material has a $Si:SiO_2:TiO_2$ mole ratio of 3:1:1.

80 wt % of the resulting negative active material, 10 wt % of Super-P, and 10 wt % of a polytetrafluoroethylene binder were mixed in N-methylpyrrolidone as a solvent to provide a negative active material slurry. The negative active material slurry was coated on a copper foil current collector to provide a negative electrode.

EXAMPLE 6

SiO with a $Si:SiO_2$ mole ratio of 1:1 was mixed with Al (with a formation free energy value of −1582 kJ/mol) at a mole ratio of 3:1. The mixture was put in a stainless steel vial containing zirconium balls at 20 times the weight of the mixture and a small amount of n-hexane as a reaction controlling agent. The mixture was milled at about 500 to 700 rpm for 100 hours to form a mechanical alloy for, preparing a nano-composite The resulting negative material has a $Si:SiO_2:Al_2O_3$ mole ratio of $3/2:1/2:1/3$.

The nano-composite was surface-treated with amorphous carbon (having electrical conductivity >$10^7$ S/m) by a chemical vapor deposition (CVD) to provide a negative active material. In the exemplary embodiment, the carbon material was surface-treated on the nano-composite in an amount of 5 wt % based on the entire weight of the nano-composite.

80 wt % of the negative active material, 10 wt % of Super-P, and 10 wt % of a polytetrafluoroethylene binder were mixed in N-methylpyrrolidone as a solvent, to provide a negative active material slurry. The negative active material slurry was coated on a copper foil current collector, to provide a negative electrode.

EXAMPLE 7

70 wt % of the negative active material prepared according to Example 6, 30 wt % of graphite, and 10 wt % of a polytetrafluoroethylene binder were mixed in N-methylpyrrolidone solvent, to provide a negative active material slurry. The negative active material slurry was coated on a copper foil current collector to provide a negative electrode.

COMPARATIVE EXAMPLE 1

SiO with a $Si:SiO_2$ mole ratio of 1:1 was mixed with Al (with a formation free energy value of −1582 kJ/mol) at a mole ratio of 3:2. The mixture was heat-treated under a nitrogen atmosphere at 900° C. for about 6 hours, to provide a negative active material. The resulting negative material has a $Si:Al_2O_3$ mole ratio of 3:1.

80 wt % of the negative active material, 10 wt % of Super-P, and 10 wt % of a polytetrafluoroethylene binder were mixed in N-methylpyrrolidone as a solvent to provide a negative active material slurry. The negative active material slurry was coated on a copper foil current collector to provide a negative electrode.

COMPARATIVE EXAMPLE 2

An active material was prepared using only SiO (a 1:1 mole ratio mixture of Si:$SiO_2$) and subjecting the mixture under the same heat treatment as in Comparative Example 1.

80 wt % of the negative active material, 10 wt % of Super-P, and 10 wt % of a polytetrafluoroethylene binder were mixed in N-methylpyrrolidone as a solvent to provide a negative active material slurry. The negative active material slurry was coated on a copper foil current collector to provide a negative electrode.

COMPARATIVE EXAMPLE 3

The active material according to Comparative Example 2 was surface-treated with amorphous carbon by chemical vapor deposition. In this example, the amount of amorphous carbon was 5 wt % based on the entire weight of the nano-composite.

80 wt % of the negative active material, 10 wt % of Super-P, and 10 wt % of a polytetrafluoroethylene binder were mixed in N-methylpyrrolidone as a solvent to provide a negative active material slurry. The negative active material slurry was coated on a copper foil current collector to provide a negative electrode.

COMPARATIVE EXAMPLE 4

70 wt % of the negative active material prepared according to Comparative Example 3, 30 wt % of graphite, and 10 wt % of polytetrafluoroethylene binder were mixed in N-methylpyrrolidone as a solvent to provide a negative active material slurry. The negative active material slurry was coated on a copper foil current collector to provide a negative electrode.

EXPERIMENTAL EXAMPLE 1

Analysis of Negative Active Materials

X-ray diffraction analysis (Philips X'pert X-ray Diff.) was performed on the active material prepared according to Example 1. The before and after results are shown in FIG. 3.

The X-ray diffraction analysis was performed at a scanning speed of 0.02°/sec by using X-ray of $CuK_\alpha$ (1.5418 Å, 40 kV/30 mA).

Figure 3:
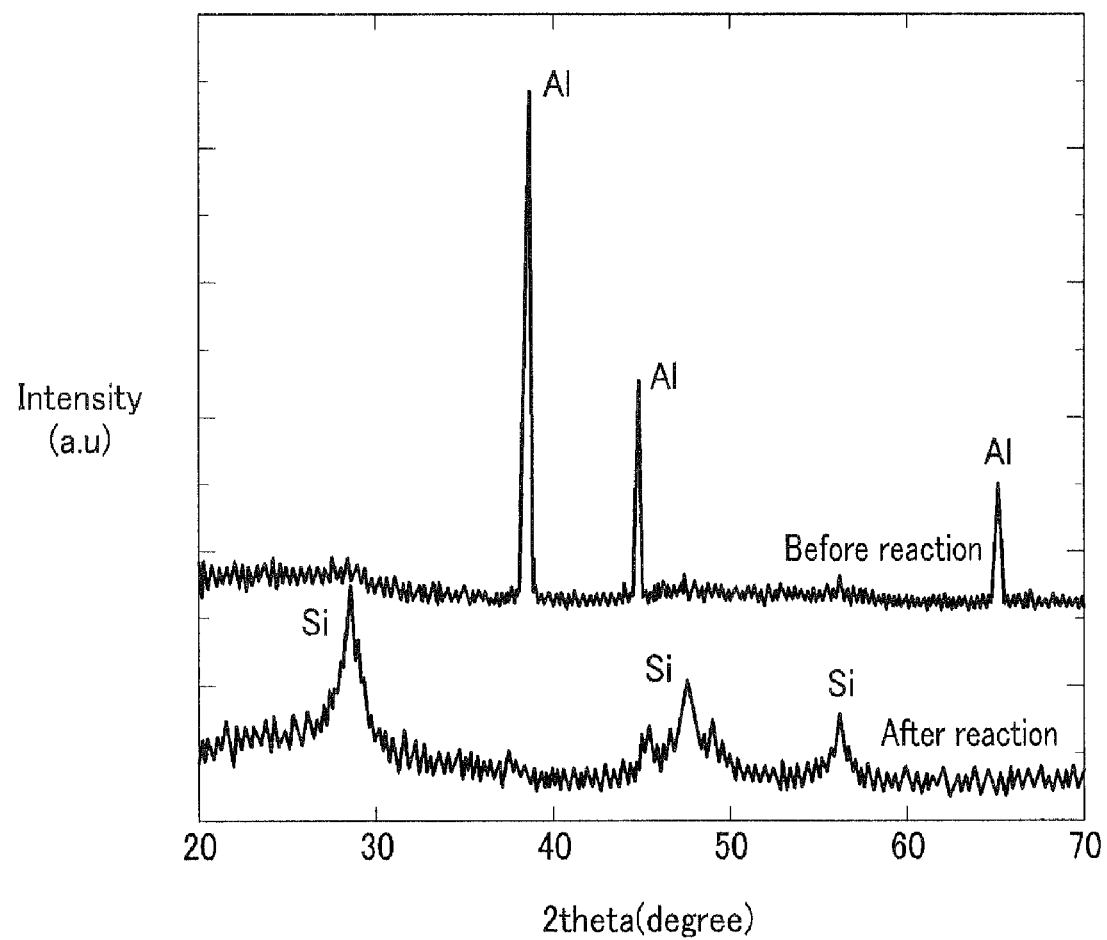
FIG. 3 depicts an X-ray diffraction analysis result of a negative active material prepared according to Example 1.

FIG. 3 is a graph showing XRD measurement results of the active material prepared according to Example 1.

As shown in FIG. 3, when the reaction was complete, the active material of Example 1 was found to have a Si phase with nanograins.

Figure 4:
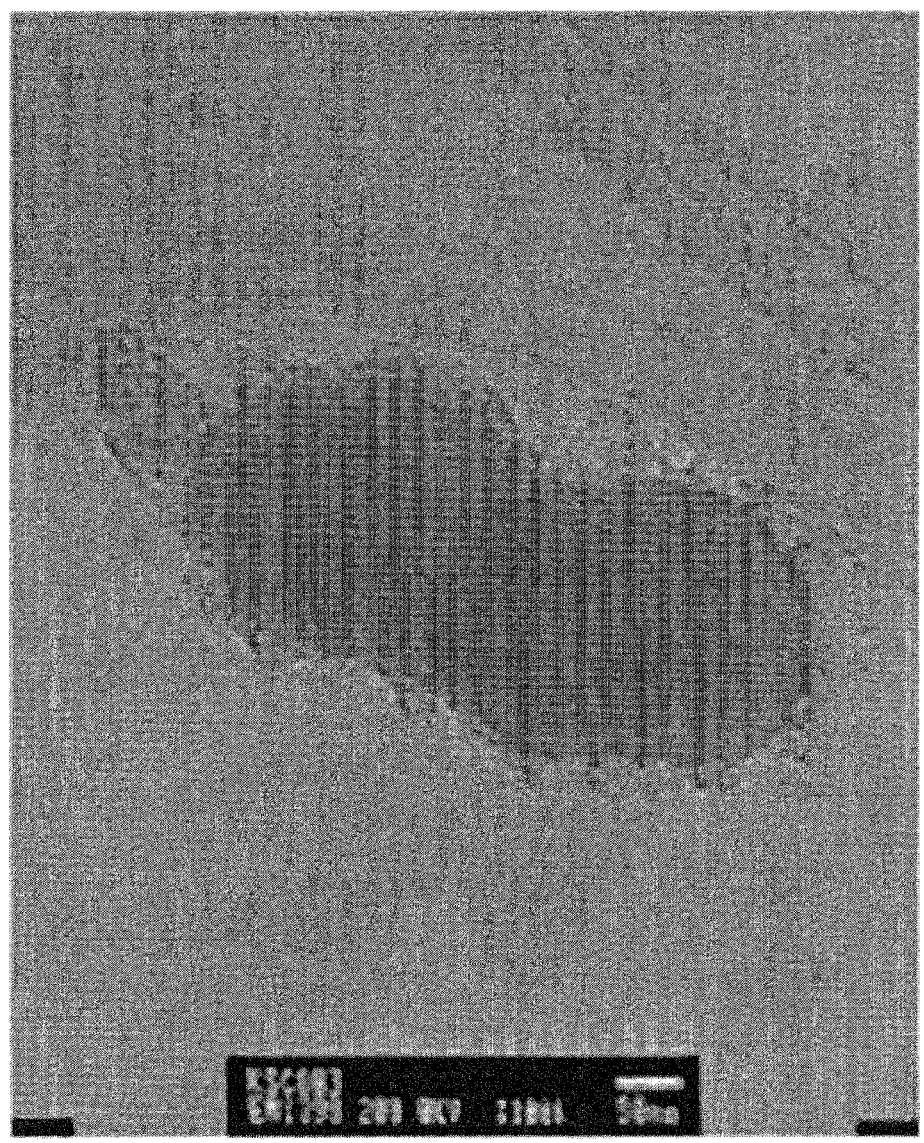
FIG. 4 depicts a transmission electron microscope photograph of a negative active material prepared according to Example 6.

As can be seen in FIG. 4, a negative active material that has surface treatment, such as the one prepared according to Example 6, can be identified using a transmission electron microscope (TEM).

As shown in FIG. 4, the nano-composite was found to have a surface treatment layer, which includes carbon on the surface.

The negative active material of Comparative Example 3 was examined in the same manner using the TEM.

The negative active material of Example 6 was found to have a surface treatment layer including carbon on the surface of SiO.

The active materials prepared according to Examples 1 to 6 and Comparative Examples 1 to 3 were measured for XPS peak position of M of the metal oxides, XRS peak position of Si 2 p, absorption spectrum position of $SiO_2$, average particle diameter, and specific surface area. The results are shown in Table 1.

TABLE 1

| | XPS peak position of M of metal oxide (eV) | XPS peak position of Si 2p (eV) | Absorption spectrum position of $SiO_2$ (cm$^{-1}$) | Average particle diameter (μm) | Specific surface area (m$^2$/g) |
|---|---|---|---|---|---|
| Example 1 | 75.6(Al) | 103.0 | 1075-1150 | 4 | 15 |
| Example 2 | 75.6(Al) | 103.0 | 1075-1150 | 4 | 15 |
| Example 3 | 347(Ca) | 103.0 | 1075-1150 | 4 | 15 |
| Example 4 | 459(Ti) | 103.0 | 1075-1150 | 4 | 15 |
| Example 5 | 459(Ti) | 103.0 | 1075-1150 | 4 | 15 |
| Example 6 | 75.6(Al) | 103.0 | 1075-1150 | 6 | 10 |
| Comparative Example 1 | 75.6(Al) | No | No | 4 | 15 |
| Comparative Example 2 | No | 103.0 | 1075-1150 | 4 | 15 |
| Comparative Example 3 | No | 103.0 | 1075-1150 | 6 | 10 |

In Table 1, the term "No" indicates that the designated element had no peak.

EXPERIMENTAL EXAMPLE 2

Evaluation of Battery Characteristics

Batteries having the negative electrodes prepared according to Examples 1 to 5 and Comparative Examples 1 and 2 were evaluated for battery characteristics using the following methods.

Each of the negative electrodes of Examples 1 to 5 and Comparative Examples 1 and 2 was used as a working electrode. A metal lithium film was used as a counter electrode. A separator made of a porous polypropylene film was inserted between the working electrode and the counter electrode. An electrolyte solution was prepared by dissolving $LiPF_6$ in a 1 mol/L concentration of a 1:1:1 vol/vol/vol mixed solvents of propylene carbonate (PC), diethyl carbonate (DEC), and ethylene carbonate (EC) to produce a 2016 coin-type half cell.

Each cell including the negative electrodes prepared according to Examples 1 to 5 and Comparative Examples 1 and 2 was charged and discharged once at a constant current of 0.1 C and between 0.01 to 2.0V. The results were used to produce an initial capacity graph, as shown in FIG. 5.

Figure 5:
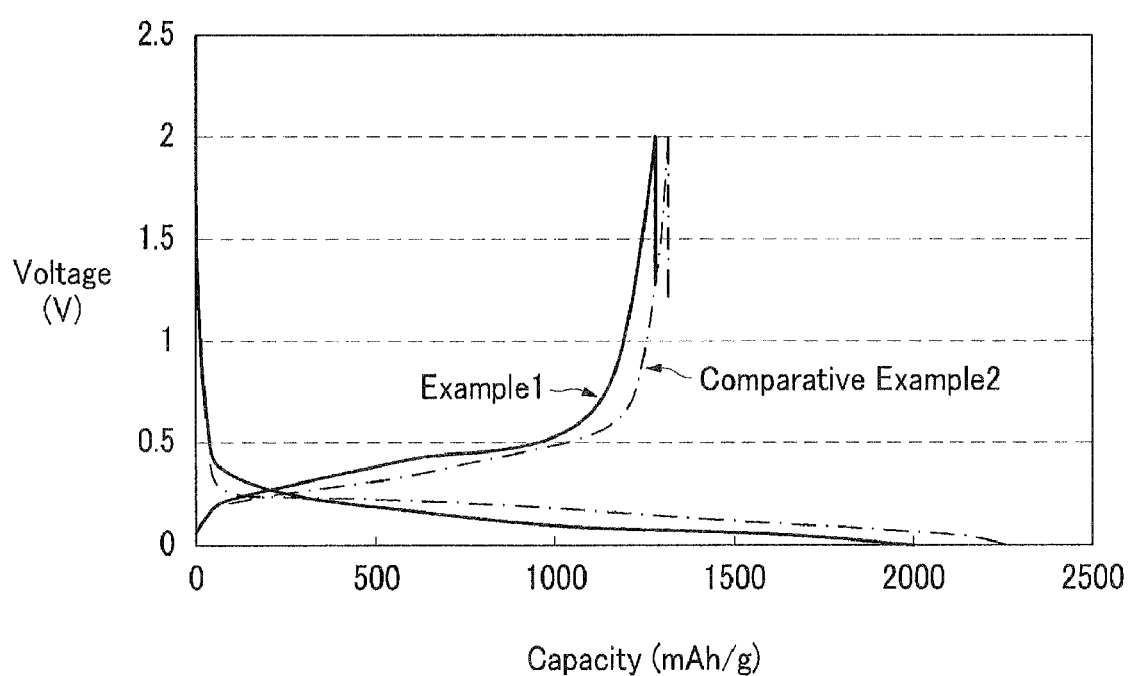
FIG. 5 is a graph showing initial capacities of battery cells with the negative electrodes prepared according to Example 1 and Comparative Example 2.

FIG. 5 shows the initial capacity graph of cells having the negative electrodes of Example 1 and Comparative Example 2.

As shown in FIG. 5, the cell with the negative electrode of Example 1 had a much better initial capacity than the one with the negative electrode of Comparative Example 2.

Based on the initial capacity graph result of cells having the negative electrodes of Examples 1 to 5 and Comparative Examples 1 and 2, the cells were evaluated for the initial efficiency.

The cells were also charged and discharged 50 times under the same condition to measure the discharge capacity at the $50^{th}$ cycles and maintenance rate of the discharge capacity at the $1^{st}$ charge and discharge. The values were then evaluated for the cycle-life characteristic.

The results are shown in the following Table 2.

TABLE 2

|  | Initial efficiency (%) | Cycle-life characteristic (%) |
| --- | --- | --- |
| Example 1 | 64 | 85 |
| Example 2 | 67 | 80 |
| Example 3 | 65 | 80 |
| Example 4 | 67 | 90 |
| Example 5 | 70 | 98 |
| Comparative Example 1 | 72 | 53 |
| Comparative Example 2 | 58 | 70 |

As shown in Table 2, the negative active materials with a nano-composite prepared by partly reducing SiO through Al, Ca, or Ti as in Examples 1 to 5 showed a much better cycle-life characteristic than the negative active material of Comparative Example 1, which includes a nano-composite prepared by completely reducing SiO through Al. In addition, the negative active materials with a nano-composite had excellent initial efficiency compared with the negative active material of Comparative Example 2, which includes only silicon oxide without doping a metal element.

The negative active material of Comparative Example 1 prepared by completely reducing SiO with Al had improved initial efficiency but a deteriorated cycle-life characteristic. Accordingly, partly-reduced SiO can contribute to improving the cycle-life characteristic.

The active material of Comparative Example 2 had a relatively good cycle-life characteristic but low initial efficiency due to the initial irreversible reaction of silicon oxide with lithium.

Battery cells having the negative electrodes of Examples 6 and 7 and Comparative Examples 3 and 4 were measured for battery characteristics using the following method.

The negative electrodes prepared according to Examples 6 and 7 and Comparative Examples 3 and 4 were used as a working electrode. A metal lithium film was used as a counter electrode. A separator made of a porous polypropylene film was inserted between the working electrode and the counter electrode. An electrolyte solution was prepared by dissolving LiPF$_6$ in 1 mol/L concentration of a 1:1:1 (vol/vol/vol) mixed solvent of propylene carbonate (PC), diethyl carbonate (DEC), and ethylene carbonate (EC) to provide a 2016 coin-type half cell.

Each cell having the negative electrodes of Examples 6 and 7 and Comparatives Example 3 and 4 was charged and discharged once between 0.01 to 2.0V under a constant current condition of 0.1 C. The initial efficiency and cycle-life characteristics of each cell were evaluated using the same method as applied to the cells having the negative electrodes of Examples 1 to 5 and Comparative Examples 1 and 2.

Each of the cells having the negative electrodes prepared according to Examples 6 and 7 and Comparative Examples 3 and 4 were charged once and then discharged to measure the thickness. Their swelling ratio was evaluated by measuring the thickness change after and before charge. The results are shown in Table 3.

TABLE 3

|  | Initial efficiency (%) | Cycle-life characteristic (%) | Swelling ratio (%) |
| --- | --- | --- | --- |
| Example 6 | 75 | 85 | 80 |
| Example 7 | 80 | 90 | 45 |
| Comparative Example 3 | 70 | 80 | 82 |
| Comparative Example 4 | 70 | 85 | 46 |

As shown in Table 3, the negative electrode including the negative active material of Example 6 that was surface-treated with a conductive material on the surface had better initial efficiency than a negative electrode having the negative active materials of Examples 1 to 5, which were not surface-treated (the result is shown in Table 2.)

The negative electrode of Example 7 had better initial efficiency and cycle-life characteristics compared with the one of Example 6 including Super-P. The reason is that graphite has better conductivity than Super-P and is frequently used to maintain a conductive network inside an electrode against volume change.

The negative electrode of Comparative Example 3 had better initial efficiency and cycle-life characteristics than the one of Comparative Example 2, which does not have a surface-treated negative active material. However, Comparative Example 3 had low initial efficiency and cycle-life characteristics as compared to the negative electrode of Example 6, which had a negative active material that was surface-treated and included partly-reduced SiO by a metal. Comparative Example 3 also had a higher swelling ratio than the one of Example 6.

The negative electrode of Comparative Example 4 had better cycle-life characteristic than the one of Comparative Example 3. However, Comparative Example 4 had lower initial efficiency and cycle-life characteristics, and a higher swelling ratio than the one of Example 7.

While this invention has been illustrated described in connection with certain exemplary embodiments, it is to be understood by those of ordinary skill in the art that various modifications and changes may be made to the described embodiments without departing from the spirit and scope of the invention, which is also defined in the appended claims.

What is claimed is:

1. A negative active material for a rechargeable lithium battery comprising a nano-composite comprising a Si phase, a SiO$_2$ phase, and a metal oxide phase of the formula M$_y$O, wherein M is a metal with an oxidation number of x and a free energy of oxygen-bond formation ranging from −900 kJ/mol to −2000 kJ/mol, and x·y=2, wherein M is selected from the group consisting of Al, Ca, Mg, Ti, and Li.

2. The negative active material of claim 1, wherein the Si phase comprises Si nanograins.

3. The negative active material of claim 1, wherein the nano-composite comprises 40 to 80 mol% of the Si phase.

4. The negative active material of claim 1, wherein the nano-composite comprises 5 to 45 mol% of the SiO$_2$ phase.

5. The negative active material of claim 1, wherein the metal oxide phase is amorphous.

6. The negative active material of claim 1, wherein the nano-composite comprises 3 to 50 mol% of the metal oxide phase.

7. The negative active material of claim 1, wherein the nano-composite has a SiO$_2$ infrared absorption spectrum ranging from 970 cm$^{-1}$ to 1150 cm$^{-1}$.

8. The negative active material of claim 1, wherein the nano-composite has a Si 2 p peak ranging from 99 eV to 106 eV according to X-ray spectroscopic analysis.

9. The negative active material of claim 1, wherein the nano-composite has an Al 2p peak ranging from 74 to 77 eV when M is Al; a Ca 2 p peak ranging from 345 to 349 eV when M is Ca; and a Ti 2 p peak ranging from 457 to 461 eV when M is Ti according to X-ray spectroscopic analysis.

10. The negative active material of claim 1, wherein the nano-composite is surface-treated with a conductive material having electrical conductivity of $1\times10^6$ S/m or more.

11. The negative active material of claim 10, wherein the conductive material is surface-treated on the nano-composite in an amount of 50 wt% or less based on the total weight of the negative active material.

12. The negative active material of claim 1, wherein the negative active material has an average particle size ranging from 0.1 μm to 100 μm.

13. The negative active material of claim 1, wherein the negative active material has a specific surface area ranging from 1 $m^2$/g to 100 $m^2$/g.

14. A negative electrode comprising:
a current collector; and
an active material layer including a negative active material and a binder disposed on the current collector,
wherein the negative active material comprises a nano-composite comprising a Si phase, a $SiO_2$ phase, and a metal oxide phase of the formula $M_yO$, wherein M is a metal with an oxidation number of x and a free energy of oxygen bond formation ranging from −900 kJ/mol to −2000 kJ/mol, and x ·y=2, wherein M is selected from the group consisting of Al, Ca, Mg, Ti, and Li.

15. The negative electrode of claim 14, wherein the Si phase comprises Si nanograins.

16. The negative electrode of claim 14, wherein the nano-composite comprises 40 to 80 mol% of the Si phase.

17. The negative electrode of claim 14, wherein the nano-composite comprises 5 to 45 mol% of the $SiO_2$ phase.

18. The negative electrode of claim 14, wherein the metal oxide phase is amorphous.

19. The negative electrode of claim 14, wherein the nano-composite comprises 3 to 50 mol% of the metal oxide phase.

20. The negative electrode of claim 14, wherein the nano-composite has a $SiO_2$ infrared absorption spectrum ranging from 970 $cm^{-1}$ to 1150 $cm^{-1}$.

21. The negative electrode of claim 14, wherein the nano-composite has a Si 2 p peak ranging from 99 eV to 106 eV according to X-ray spectroscopic analysis.

22. The negative electrode of claim 14, wherein the nano-composite has an Al 2 p peak ranging from 74 to 77 eV when M is Al; a Ca 2p peak ranging from 345 to 349 eV when M is Ca; and a Ti 2 p peak ranging from 457 to 461 eV when M is Ti according to X-ray spectroscopic analysis.

23. The negative electrode of claim 14, wherein the nano-composite is surface-treated with a conductive material having electrical conductivity of $1\times10^6$ S/m or more.

24. The negative electrode of claim 23, wherein the conductive material is present in an amount of 50 wt% or less based on the total weight of the negative active material.

25. The negative electrode of claim 14, wherein the negative active material has an average particle size ranging from 0.1 μm to 100 μm.

26. The negative electrode of claim 14, wherein the negative active material has a specific surface area ranging from 1 $m^2$/g to 100 $m^2$/g.

27. A rechargeable lithium battery comprising a negative electrode according to claim 14.

\* \* \* \* \*